C. M. WHITEHEAD.
Basket.
No. 217,968.  Patented July 29, 1879.
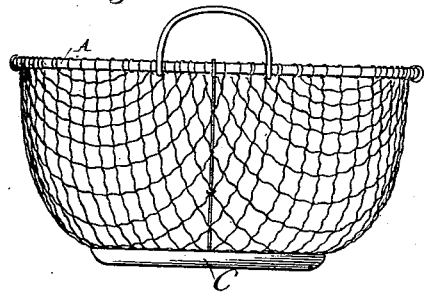
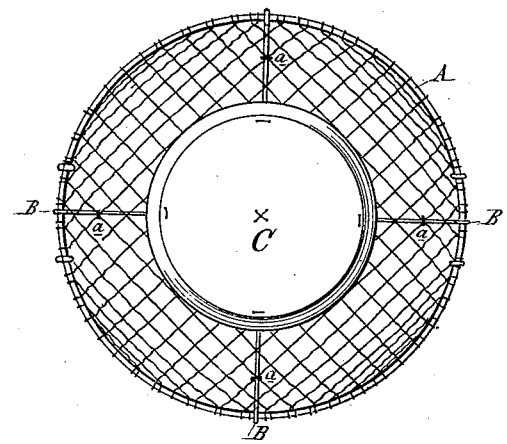
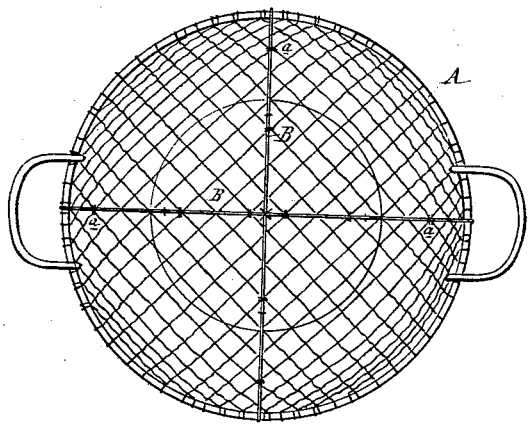
Attest:
A. Barthel
Theo. S. Day
Inventor:
C. M. Whitehead
By Atty
Theo. S. Sprague

UNITED STATES PATENT OFFICE.

CHARLES M. WHITEHEAD, OF PONTIAC, MICHIGAN.

IMPROVEMENT IN BASKETS.

Specification forming part of Letters Patent No. 217,968, dated July 29, 1879; application filed January 4, 1879.

*To all whom it may concern:*

Be it known that I, CHARLES M. WHITEHEAD, of Pontiac, in the county of Oakland and State of Michigan, have invented an Improvement in Baskets, of which the following is a specification.

The nature of my invention relates to new and useful improvements in the construction of baskets, by means of which a basket is produced of very enduring qualities.

The invention consists in the improvements in the manufacture of baskets, as more fully hereinafter set forth and described.

Figure 1 is an elevation of my improved basket. Fig. 2 is a plan view of the basket upside down. Fig. 3 is a plan view from the top.

In the accompanying drawings, which form a part of this specification, there is shown a basket made of wire, woven and crimped in the following manner: Soft wire is woven in such a manner that at the points of intersection of the wires they are bent or crimped. A piece of wire-cloth woven in this way is cut into round pieces of sufficient size to form a basket of the size required. This piece is then laid upon a block of the size and form required, and the cloth bent into the shape, the free ends of the various wires forming the cloth being secured by wrapping around the bale A. Stiffening-wires B, the free ends of which are fastened to the bale, are inserted within the basket thus formed, and removed from the block and intermediately secured to the walls of the basket by a wire tie, *a*. A round block of wood, C, or metal is attached to the bottom of the basket, to prevent the wire part being brought into contact with moisture when in use. This bottom is secured to the bottom of the basket by wire loops, or in any convenient manner.

I am aware that baskets have been made of wire crossing each other in different directions, and secured at their points of intersection by tying with fine wire. In practice it is found that such baskets are wanting in solidity and firmness, and, by reason of the failure of the fine-wire tying, soon go to pieces.

The object I have in view is to produce a basket of woven crimped wire, the crimps being made at the points of intersection, to give great firmness and solidity to the structure, to avoid the necessity of tying the intersecting wires together, and to simplify and cheapen the construction.

The baskets may be made of plain or galvanized wire, and of any desirable size or form. If made of plain wire, to prevent oxidation they should be painted.

What I claim as my invention, and desire to secure by Letters Patent, is—

The basket described, made of woven and crimped wire, having the rim A, with handles attached, the stiffening-wires B, and bottom C, constructed substantially as set forth and shown.

CHARLES M. WHITEHEAD.

Witnesses:
H. S. SPRAGUE,
CHARLES J. HUNT.